United States Patent
Rossi

(10) Patent No.: US 10,945,408 B2
(45) Date of Patent: Mar. 16, 2021

(54) LITTER SIFTER LINER

(71) Applicant: Nicola Rossi, Fort Lauderdale, FL (US)

(72) Inventor: Nicola Rossi, Fort Lauderdale, FL (US)

( * ) Notice: Subject to any disclaimer, the term of this patent is extended or adjusted under 35 U.S.C. 154(b) by 254 days.

(21) Appl. No.: 16/283,435

(22) Filed: Feb. 22, 2019

(65) Prior Publication Data

US 2020/0267928 A1    Aug. 27, 2020

(51) Int. Cl.
*A01K 1/00* (2006.01)
*A01K 1/01* (2006.01)

(52) U.S. Cl.
CPC .................. *A01K 1/0114* (2013.01)

(58) Field of Classification Search
CPC ........ A01K 1/00; A01K 1/0107; A01K 1/011; A01K 1/0114
USPC .......................................... 119/161, 165–170
See application file for complete search history.

(56) References Cited

U.S. PATENT DOCUMENTS

| | | | | |
|---|---|---|---|---|
| 1,942,287 | A * | 1/1934 | Heitz | A47B 13/086 206/447 |
| 8,074,603 | B2 * | 12/2011 | Ohlman | A01K 1/0114 119/167 |
| 2009/0194033 | A1 * | 8/2009 | Modlin | A01K 1/0114 119/167 |
| 2015/0334981 | A1 * | 11/2015 | Matsuo | A01K 1/0107 119/165 |
| 2018/0020635 | A1 * | 1/2018 | Huang | A01K 1/0114 119/166 |

* cited by examiner

*Primary Examiner* — Richard T Price, Jr.

(57) ABSTRACT

A litter sifter liner used to facilitate the cleanup process of a convention litter box. Additionally, the litter sifter liner is designed to recycle the litter on a daily basis minimizing waste and maintaining upkeep. To achieve this, the liner has a sifter with a reinforced liner, and a plurality of identification tabs. The sifter is mounted into the base panel of the liner and positioned centrally with respect to the litter box sidewalls. This allows the transfer of litter to be contained within the perimeter of the litter box. The plurality of tabs are positioned offset with respect to each other. This indicates the total number of bags left for usage.

15 Claims, 9 Drawing Sheets

LITTER SIFTER LINER

FIELD OF THE INVENTION

The present invention generally relates to waste management systems. More specifically, the present invention is a combination of liners designed to protect pet litter boxes.

BACKGROUND OF THE INVENTION

Cleaning up a pet litter pan is a task that every pet owner must accomplish. Cats generally bury their waste, and as such it can be difficult for the user to thoroughly clean a litter pan without dedicated accessories. Furthermore, during that process it is not uncommon for sand to be spilled from the interior of the litter box around the surrounding area. As a general rule, in order to remove the waste, users typically use dedicated shovels that separate the waste from the litter. The user then transfers the waste to a plastic bag or other receptacle to ensure the waste is disposed correctly. The process of individually scooping out feces is unpleasant and time consuming. The present invention aims to solve some of the issues mentioned above by disclosing a waste management system, which may be used universally in any type of litter pan. The present invention is designed with removable liners that separate the usable litter from the waste. In addition, no other tools are required for cleanup when the present invention is in use. The liners are specifically designed to be removable, recyclable and disposable, with opening large enough for the litter to fall through, but small enough to keep the waste contained in the receptacle of the liner.

DETAIL DESCRIPTIONS OF THE INVENTION

Figure 1:
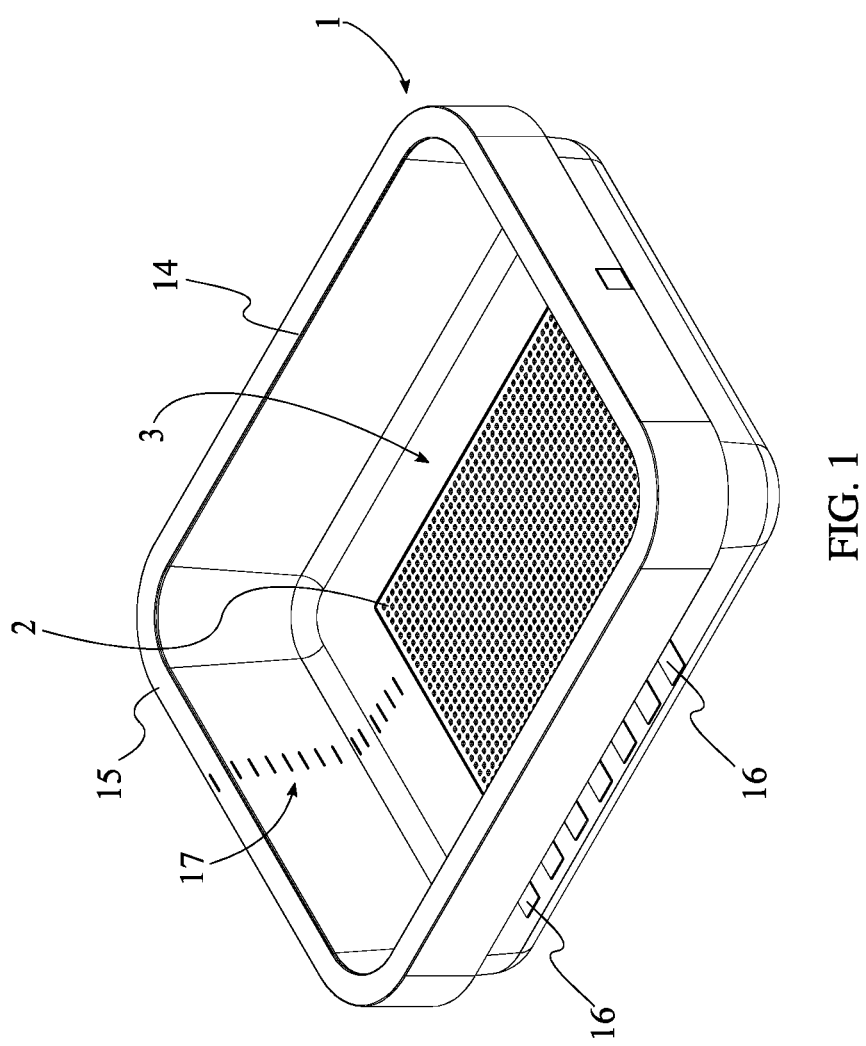
FIG. 1 is an isometric perspective view of the present invention.

All illustrations of the drawings are for the purpose of describing selected versions of the present invention and are not intended to limit the scope of the present invention.

Referring to FIGS. 1-9, the present invention, a litter sifter liner, is a device that is used to clean litter boxes on a regular basis. The process of maintaining a clean litter box can be an unpleasant experience. However, any responsible pet owner must complete this task. Preferably, the term litter box, is used herein to refer to any container specifically designated to hold litter for pets. The litter box can be of different shapes and sizes, including but not limited to square, rectangle, or circular. The present invention is a disposable containment system designed to maintain the cleanliness of a pet litter box. Furthermore, the present invention is flexible and adaptable to a numerous litter boxes of various shapes and sizes. Additionally, the present invention allows recycling of the litter over the course of a week. As a general rule, used litter must be changed at seven-day intervals to ensure a clean environment is provided for the pet. The present invention is specifically designed to be used weekly. To achieve this functionality, the present invention comprises a plurality of bags 1, at least one sifter 2, and at least one reinforcing liner 3. The plurality of bags 1, function as the primary container for any conventional litter box. The plurality of bags 1, further comprises a base bag 11 and at least on sifting bag 12. The base bag 11 is positioned between the litter box and the plurality of sifting bags 12. The sifting bag 12, is mounted within the base bag 11. As a result, the plurality of bags 1 is layered within the litter box.

Figure 2:
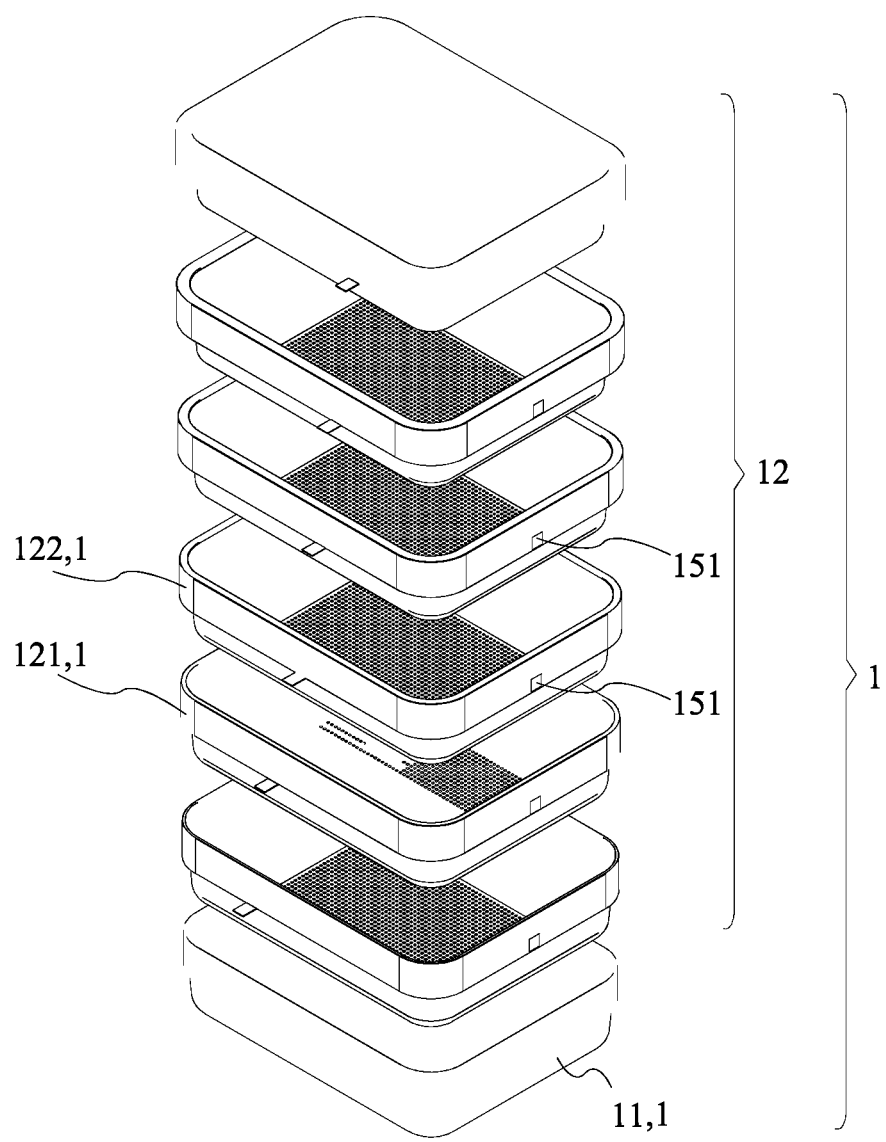
FIG. 2 is a perspective exploded view of the present invention.

In reference to FIG. 2, in the preferred embodiment, a total of six sifting bags 12 are included; however, the number may be adjusted depending on user preference and necessity. The number of the plurality of sifting bags 12 may be further adjusted depending on the type of litter used in the litter box. Each sifting bag 12 corresponds to specific day of the week, and should be replaced daily, or depending on use. The plurality of bags 1 each comprises a base panel 13, a tubular sidewall 14, a foldable margin 15, and at least one indicator tab 16. The base panel 13 is terminally connected to the tubular sidewall 14. As a result, the base panel 13 and the tubular sidewall 14 delineate the overall shape of the plurality of bags 1. The foldable margin 15 is terminally connected to the tubular sidewall 14, opposite to the base panel 13. Accordingly, the plurality of bags can be folded over a rim of the litter box. The base panel 13, the tubular sidewall 14 and the foldable margin 15 form a containment area where the litter is stored. In the preferred embodiment, the present invention provides a liquid resistant layer between the litter and the box. The indicator tab 16 is adjacently connected to the foldable margin 15, opposite to the tubular sidewall 14. The indicator tab 16 functions as an identification label. Furthermore, the indicator tab 16, is preferably defined with a numerical indicator ranging from one to seven, and the corresponding plurality of bags 1. The sifter 2 is integrated into the base panel 13 of the sifting bag 12. The sifter 2 is centrally positioned into the base panel 13, equidistant from the tubular sidewall 14 and the foldable margin 15. The central positioning ensures the litter is contained within the perimeter of the litter box during the transfer process, reducing the possibility of spilling the waste. The reinforcing liner 3 is superimposed onto the sifter 2. Consequently, the reinforced liner 3 is directly integrated into the sifter 2, increasing the thickness of the base panel 13 to overcome the structural deficiencies from the plurality of holes that make up the sifter 2. As a result, the base panel 13 is able to withstand the weight of the waste that is sifted out of the litter as it passes through the sifter 2.

Figure 3:
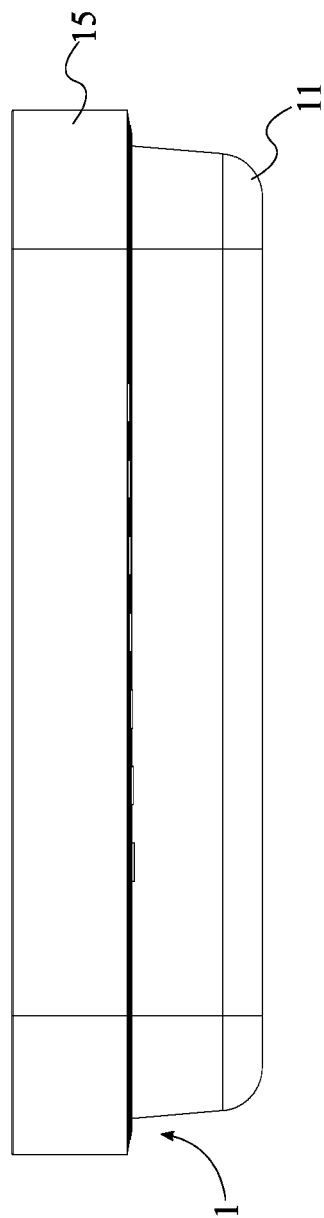
FIG. 3 is a front view of the present invention.
Figure 4:
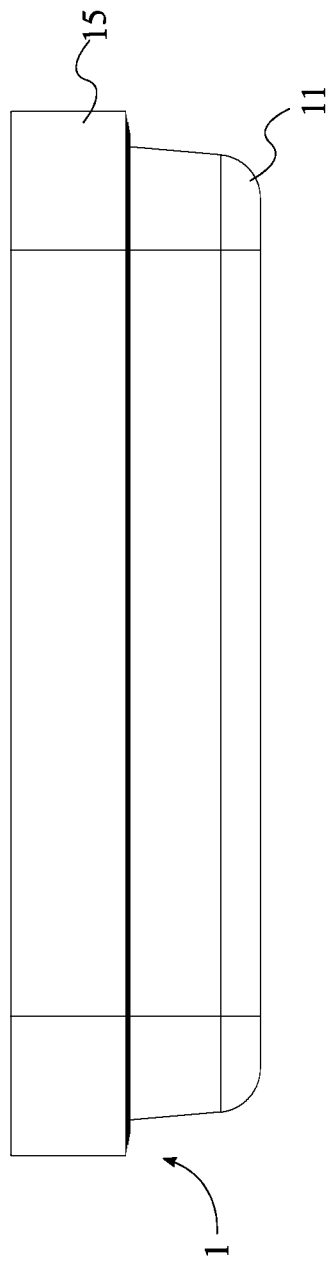
FIG. 4 is a back view of the present invention.

In reference to FIGS. 1-3 the present invention separates the litter traditionally used in pet litter boxes, from the fecal matter produced by the pet. Preferably the at least one sifting bag 12 is a plurality of sifting bags 12. Alternatively, in another embodiment the present invention is fully operational with one sifting bag 12. The plurality of sifting bags 12 comprises an arbitrary bag 121 and an adjacent bag 122. The arbitrary bag 121 is identical in design and function to the adjacent bag 122. The arbitrary bag 121 is positioned in between the adjacent bag 122 and the base bag 11. Therefore, the arbitrary bag 121 and the adjacent bag 122 are concentrically layered. The adjacent bag 122 may be removed after usage allowing the litter stored within to be transferred into the arbitrary bag 121. Specifically, as the user lifts the adjacent bag 122 from the litter box, the litter is transferred through the sifter 2 into the arbitrary bag 121. The sifter 2 is large enough to allow the granules of litter to pass thorough, while retaining the waste in the adjacent bag 122. The present invention is designed to be used with conventional litter boxes, facilitating the cleanup process of the interior cavity. After the last sifting bag 12 is used, the leftover litter is transferred into the base bag 11. As an example, on day six, the user would transfer the litter from the sifting bag 12 to the base bag 11. Furthermore, on day seven the litter would be contained altogether within the base bag 11, allowing complete removal from the litter box, leaving the container of the litter box free of any contaminates.

Figure 5:
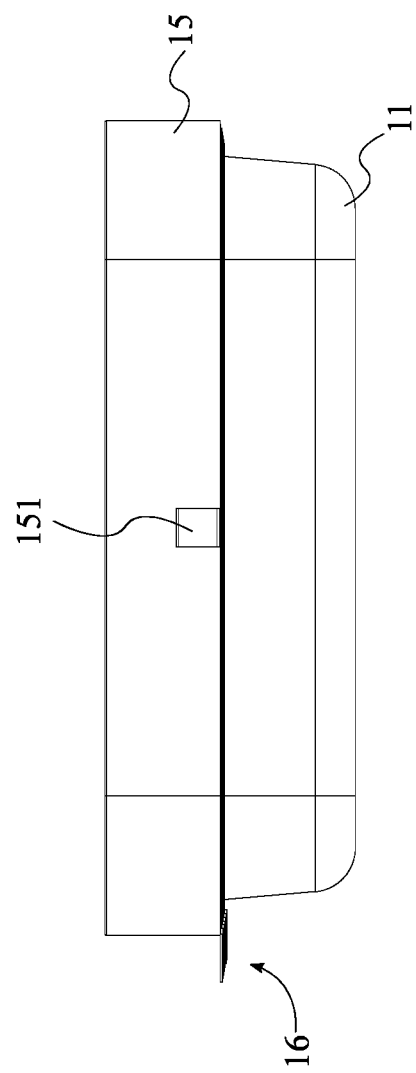
FIG. 5 is a right-side view of the present invention.
Figure 6:
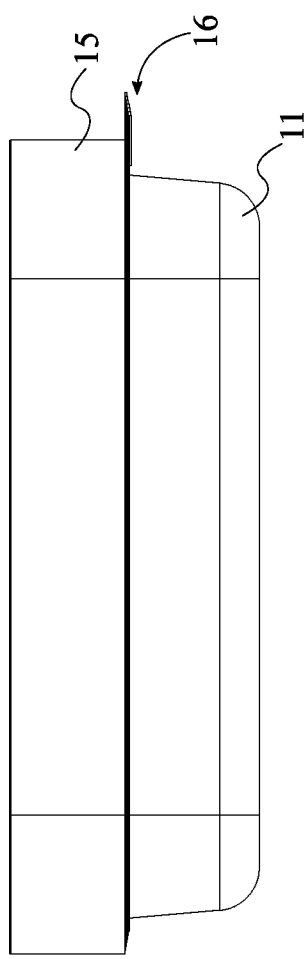
FIG. 6 is a left side view of the present invention.
Figure 7:
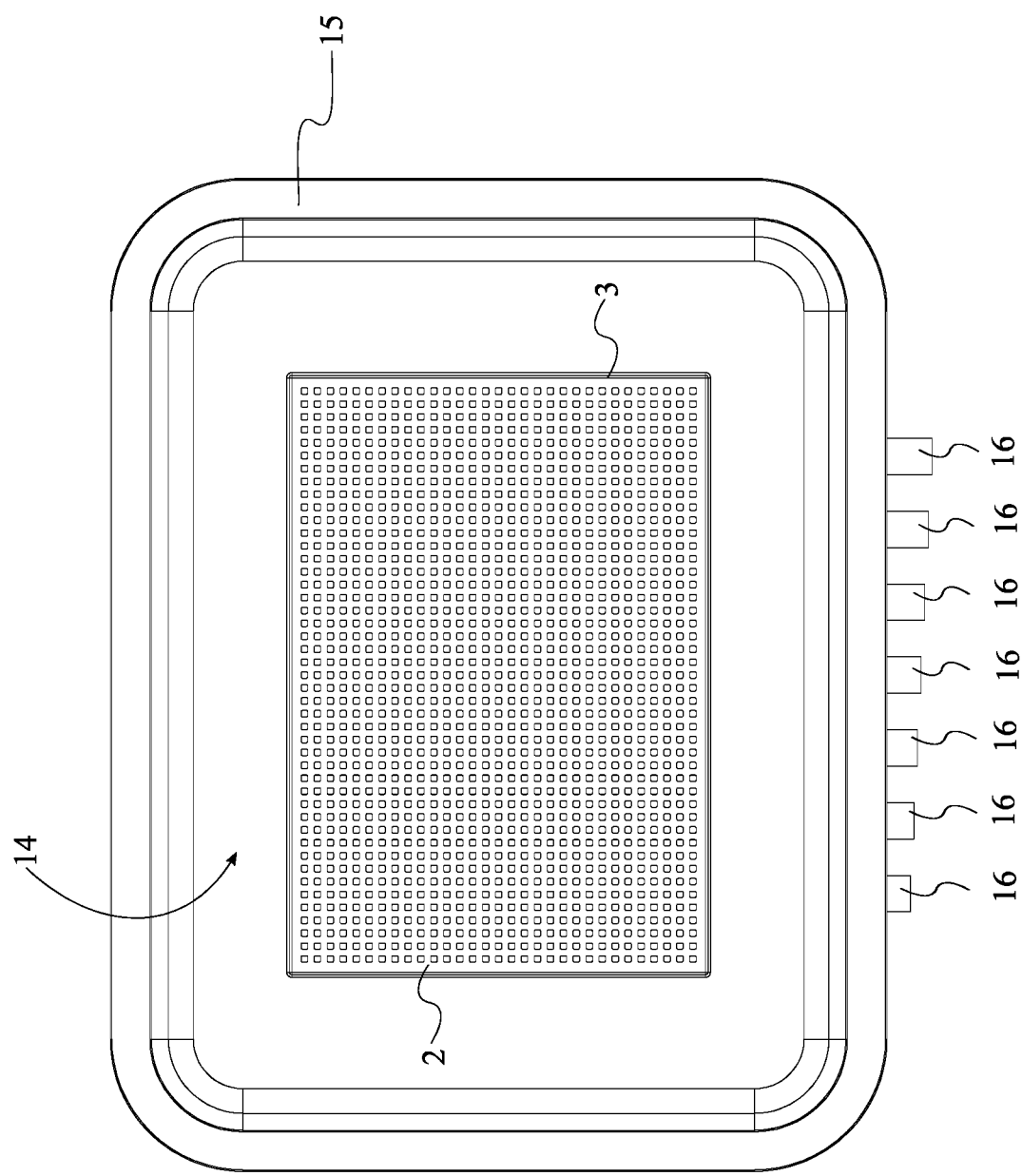
FIG. 7 is a top view of the present invention.
Figure 8:
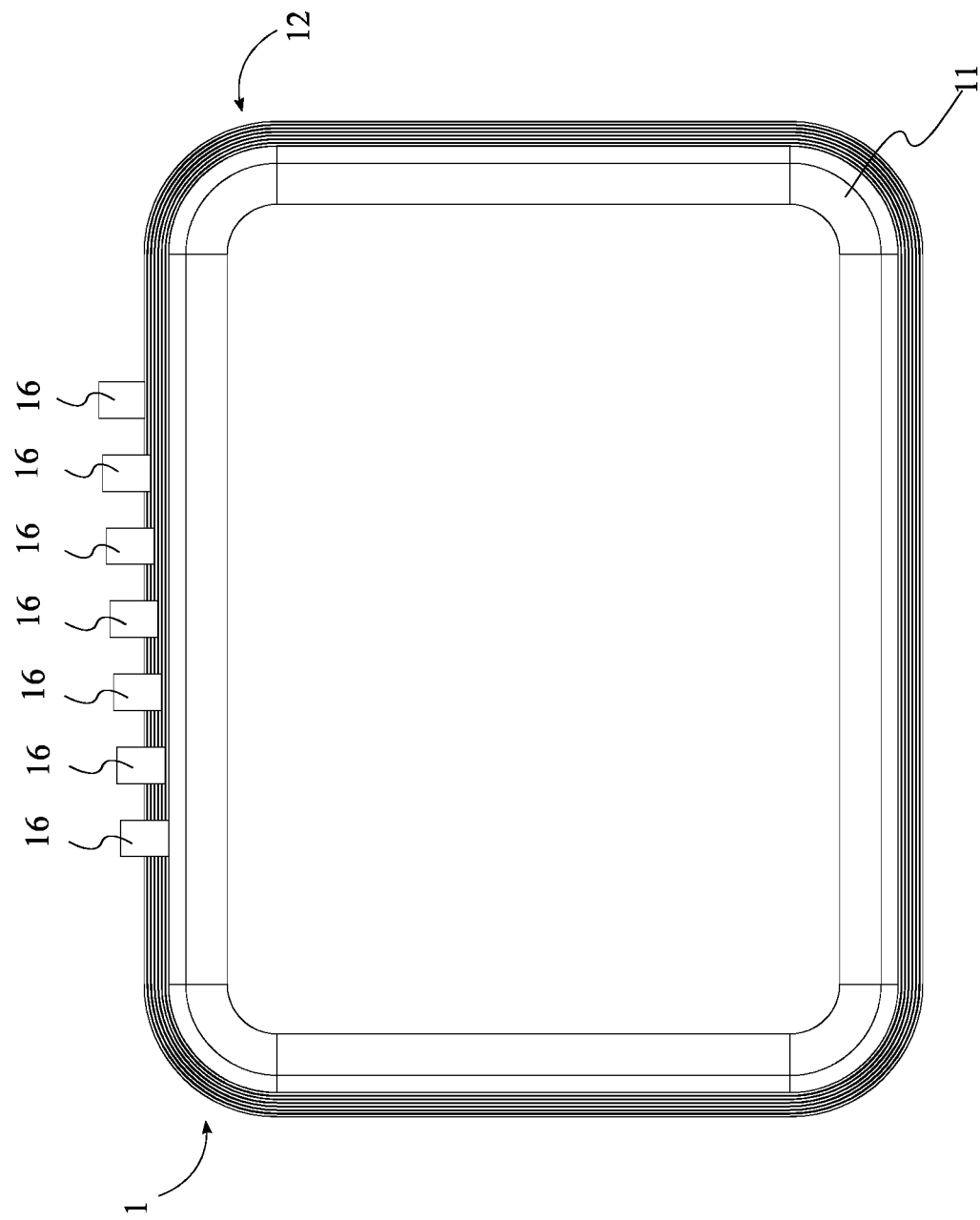
FIG. 8 is a bottom view of the present invention.

In reference to FIGS. 5-7. the at least one indicator tab 16, is a plurality of indicator tabs 16. In the preferred embodiment, each bag 1 comprises at least one indicator tab 16. Alternatively, more than one indicator tabs 16 may be included in the present invention. As a result, the plurality of bags 1 is assigned to a specific day of the week, and the indicator tab 16 indicates the corresponding day. The plurality of indicator tabs 16 is distributed around an opening of the base bag 11. The tab 16 is attached at one end to the opening of the plurality of bags 1. In the preferred embodiment a numerical inscription is embedded into the tab 16 which corresponds to the specific day of the week. Various other inscriptions may be embedded onto the indicator tab 16 including but not limited to letters, braille, or numbers. The plurality of indicator tabs 16 is positioned offset from each other around the opening of the base bag 11. In reference to FIG. 7 and FIG. 8 the plurality of indicator tabs 16 is positioned in an ascending arrangement, ranging from the first day to the final day, where each tab is visible. Preferably, the offset positioning of the plurality of indicator tabs 16 is equidistant, however other arrangements are possible without departing from the scope of the invention. As a result, the array of indicator tabs 16 is visible, allowing the user to see the number of bags 1 left within the litter box after each use.

The present invention may be configured according to user needs. As a result, the folded configuration enables the plurality of bags to be positioned over the rim of the litter box, securing the present invention to the container. The lateral surface of the foldable margin 15 is angularly offset from the tubular sidewall 14 by an obtuse angle. The base panel 13, the tubular sidewall 14, and the foldable margin 15 define the interior container of the plurality of bags 1. When the present invention is placed into a conventional litter box, the foldable margin 15 is adjacently positioned around the outer rim of the box. Furthermore, the foldable margin 15 is in a folded configuration. In the folded embodiment a lateral surface of the foldable margin 15 is angularly offset from the tubular sidewall 14 by an arbitrary acute angle. The foldable margin 15 is concentrically mounted around the outer lip of the litter box. Furthermore, the opening of the plurality of bags 1 is secured to the corresponding opening of the litter box. As a result, the foldable margin 15 will not collapse into the interior cavity of the litter box, when litter or the pet are within.

Figure 9:
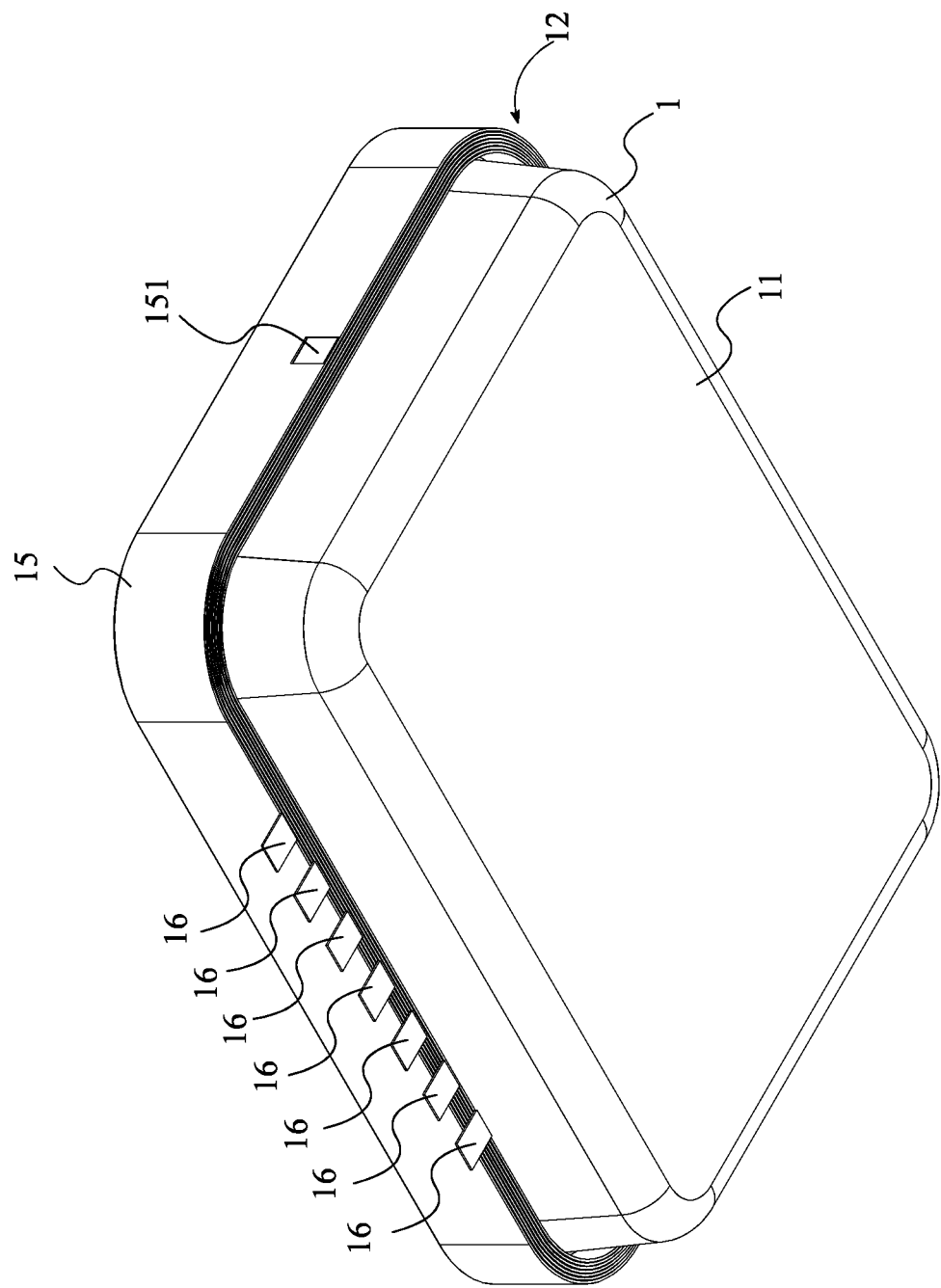
FIG. 9 is a bottom perspective view of the present invention.

In reference to FIG. 9, the present invention further comprises a plurality of drawstrings 151. This enables the user to secure the plurality of bags 1, preventing the contents from accidentally being spilled. Additionally, the plurality of drawstrings 151 works as a handle from which the assembly may be transported. The plurality of drawstrings 151 is integrated into the foldable margin 15 for a corresponding bag, where the corresponding bag is from the plurality of bags 1. As a result, the foldable margin 15 is secured, preventing the waste contents within from being accidentally spilled. The plurality of drawstrings 151 is positioned around the opening of the corresponding bag 1. The plurality of drawstrings 151 is tethered to the foldable margin 15 through a dedicated guide channel. Furthermore, when the foldable margin 15 is in the folded configuration the plurality of drawstrings 151 secures the bag 1 to the litter box. Accordingly, the guide channel may further comprise an opening, allowing the user access to the plurality of drawstrings 151. If the user applies a pulling force at one end of the plurality of drawstrings 151, the guide channel directs the plurality of drawstrings 151 through the opening. Resultantly, the plurality of plurality of drawstrings 151 opens and closes the opening of the plurality of bags 1. In some embodiments of the present invention the plurality of drawstrings 151 is elastic, allowing the plurality of bags 1 to be secured to the outside edge of the litter box.

In reference to FIG. 1, the level of litter used in each litter box varies depending on the shape and design of the container, as well as the requirements of the pet. The plurality of bags 1 comprises a plurality of fill-level indicators 17. The correct level of litter in a litter box, depends on a multitude of factors including but not limited to, the shape, size, and design of the box itself. The plurality of fill-level indicators 17 enable the user to monitor the necessary level of litter into a litter box. The overall level of litter in the container, is gradually reduces through the week, and especially during the transfer process. The plurality of fill level indicators 17 inform the user if the level of litter in the box is too low. In some instances, if the level of litter is not sufficient the pet may not use the box as intended. The plurality of fill level indicators 17 is adjacently connected to the tubular sidewall 14. As a result, the plurality of fill level indicators 17 is locked into position during use. The present invention is designed to be universally used in most litter boxes. Therefore, the user is able to adjust the placement of the tubular sidewall 14 to correspond to the sidewall of their own litter box. The plurality of fill level indicators 17 is linearly distributed along the tubular sidewall 14.

Although the invention has been explained in relation to its preferred embodiment, it is to be understood that many other possible modifications and variations can be made without departing from the spirit and scope of the invention as hereinafter claimed.

What is claimed is:

1. A litter sift liner comprising:
a plurality of bags;
at least one sifter;
at least one reinforcing liner;
the plurality of bags comprising a base bag, at least one sifting bag;
the base bag and the sifting bag each comprising a base panel, a tubular sidewall, a foldable margin, and at least one indicator tab;
the sifting bag being mounted within the base bag;
the base panel being terminally connected to the tubular sidewall;
the foldable margin being terminally connected to the tubular sidewall, opposite to the base panel;
the indicator tab being adjacently connected to the foldable margin, opposite to the tubular sidewall;
the sifter being integrated into the base panel of the sifting bag; and
the reinforcing liner being superimposed onto the sifter.

2. The litter sifter liner as claimed in claim 1 comprising:
the at least one sifting bag being a plurality of sifting bags;
the plurality of sifting bags comprising an arbitrary bag and an adjacent bag; and the arbitrary bag being positioned in between the adjacent bag and the base bag.

3. The litter sifter liner as claimed in claim 1 comprising:
the at least one indicator tab being a plurality of indicator tabs; and
the plurality of indicator tabs being distributed around an opening of the base bag.

4. The litter sifter liner as claimed in claim 3 comprising:
the plurality of indicator tabs being positioned offset from each other around the opening of the base bag.

5. The litter sifter liner as claimed in claim 1 comprising:
wherein the foldable margin is in an upright configuration; and
a lateral surface of the foldable margin being angularly offset from the tubular sidewall by an obtuse angle.

6. The litter sifter liner as claimed in claim 1 comprising:
wherein the foldable margin is in a folded configuration; and
a lateral surface of the foldable margin being angularly offset from the tubular sidewall by an acute angle.

7. The litter sifter liner as claimed in claim 1 comprising:
a plurality of drawstrings;
the plurality of drawstrings being integrated into the foldable margin for a corresponding bag, wherein the corresponding bag is from the plurality of bags; and
the drawstring being positioned around an opening of the corresponding bag.

8. The litter sifter liner as claimed in claim 1 comprising:
a plurality of fill-level indicators;
the plurality of fill-level indicators being adjacently connected to the tubular sidewall; and
the plurality of fill-level indicators being linearly distributed along the tubular sidewall.

9. A litter sift liner comprising:
a plurality of bags;
at least one sifter;
at least one reinforcing liner;
the plurality of bags comprising a base bag, at least one sifting bag;
the base bag and the sifting bag each comprising a base panel, a tubular sidewall, a foldable margin, and at least one indicator tab;
the sifting bag being mounted within the base bag;
the base panel being terminally connected to the tubular sidewall;
the foldable margin being terminally connected to the tubular sidewall, opposite to the base panel;
the indicator tab being adjacently connected to the foldable margin, opposite to the tubular sidewall;
the sifter being integrated into the base panel of the sifting bag;
the reinforcing liner being superimposed onto the sifter;
the at least one indicator tab being a plurality of indicator tabs; and
the plurality of indicator tabs being distributed around an opening of the base bag.

10. The litter sifter liner as claimed in claim 9 comprising:
the at least one sifting bag being a plurality of sifting bags;
the plurality of sifting bags comprising an arbitrary bag and an adjacent bag; and
the arbitrary bag being positioned in between the adjacent bag and the base bag.

11. The litter sifter liner as claimed in claim 9 comprising:
the plurality of indicator tabs being positioned offset from each other around the opening of the base bag.

12. The litter sifter liner as claimed in claim 9 comprising:
wherein the foldable margin is in an upright configuration; and
a lateral surface of the foldable margin being angularly offset from the tubular sidewall by an obtuse angle.

13. The litter sifter liner as claimed in claim 9 comprising:
wherein the foldable margin is in a folded configuration; and
a lateral surface of the foldable margin being angularly offset from the tubular sidewall by an acute angle.

14. The litter sifter liner as claimed in claim 9 comprising:
a plurality of drawstrings;
the plurality of drawstrings being integrated into the foldable margin for a corresponding bag, wherein the corresponding bag is from the plurality of bags; and
the drawstring being positioned around an opening of the corresponding bag.

15. The litter sifter liner as claimed in claim 9 comprising:
a plurality of fill-level indicators;
the plurality of fill-level indicators being adjacently connected to the tubular sidewall; and
the plurality of fill-level indicators being linearly distributed along the tubular sidewall.

\* \* \* \* \*